Sept. 18, 1945.     C. T. WALTER     2,385,322
SOAP MOLDING MACHINE
Filed Aug. 13, 1942     7 Sheets-Sheet 1
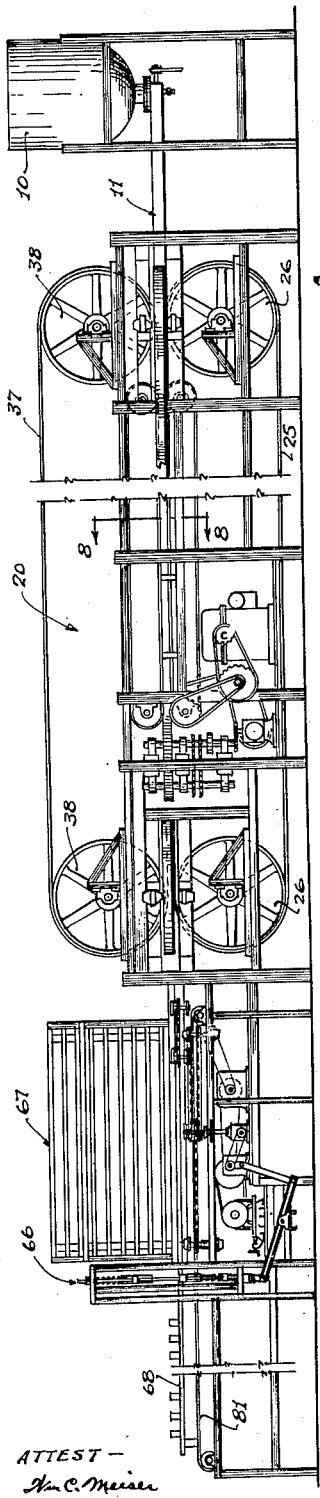
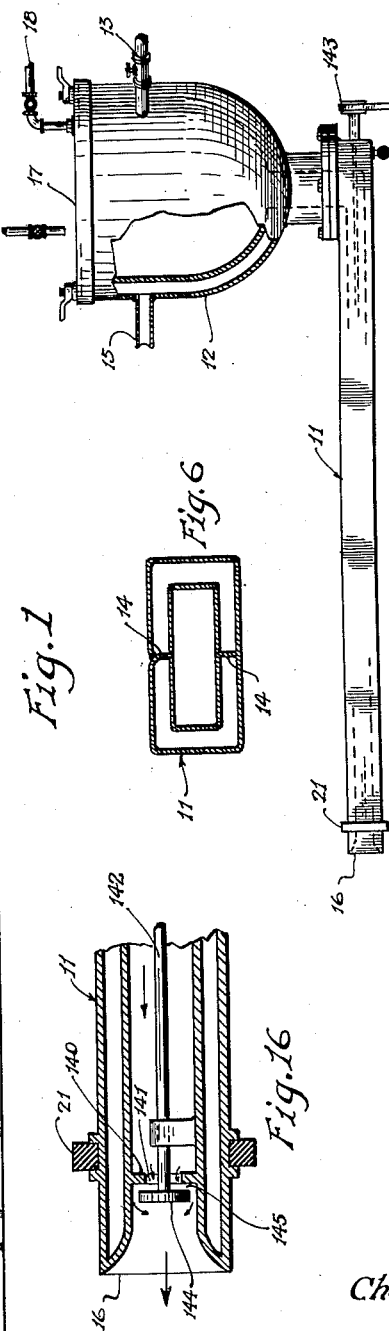
Charles T. Walter
INVENTOR
BY R.H. Story
ATTORNEY
ATTEST—

Sept. 18, 1945.  C. T. WALTER  2,385,322
SOAP MOLDING MACHINE
Filed Aug. 13, 1942  7 Sheets-Sheet 2
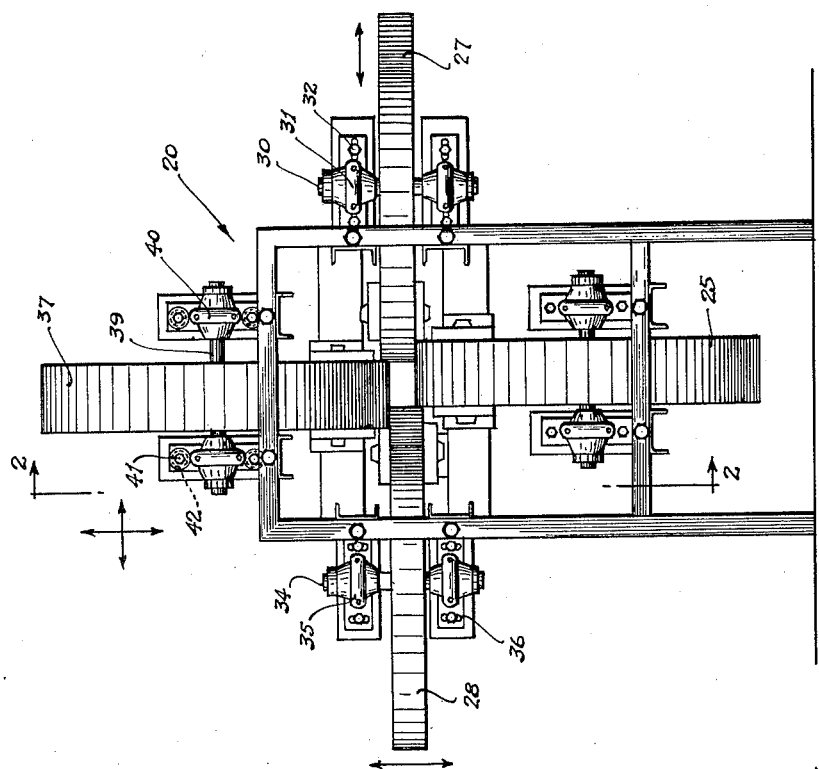
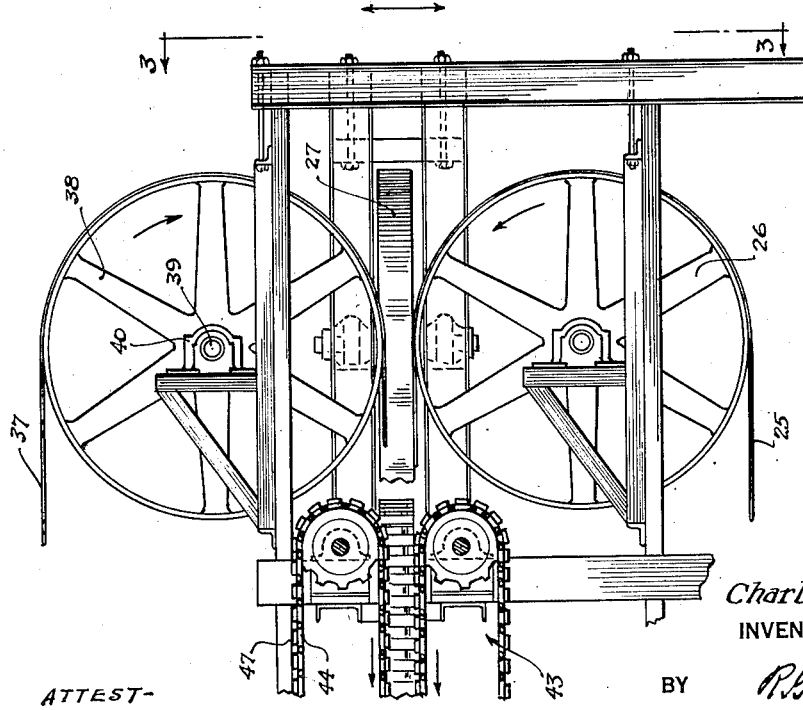
Charles T. Walter
INVENTOR Sept. 18, 1945.   C. T. WALTER   2,385,322
SOAP MOLDING MACHINE
Filed Aug. 13, 1942   7 Sheets-Sheet 3

Charles T. Walter
INVENTOR

ATTEST—

BY
ATTORNEY

Sept. 18, 1945.  C. T. WALTER  2,385,322
SOAP MOLDING MACHINE
Filed Aug. 13, 1942  7 Sheets-Sheet 5

Charles T. Walter
INVENTOR

BY R.B. Story
ATTORNEY

ATTEST -
Wm C. Meiser

Sept. 18, 1945.  C. T. WALTER  2,385,322
SOAP MOLDING MACHINE
Filed Aug. 13, 1942   7 Sheets-Sheet 6

Charles T. Walter
INVENTOR

ATTEST

BY

ATTORNEY

Sept. 18, 1945.   C. T. WALTER   2,385,322
SOAP MOLDING MACHINE
Filed Aug. 13, 1942   7 Sheets-Sheet 7
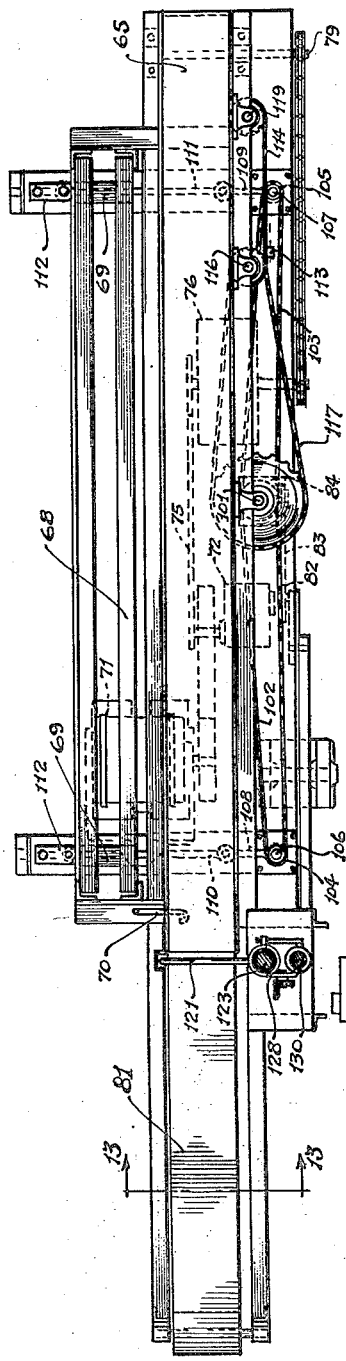
Charles T. Walter
INVENTOR
ATTEST- Patented Sept. 18, 1945

2,385,322

UNITED STATES PATENT OFFICE 2,385,322

SOAP MOLDING MACHINE

Charles T. Walter, Chicago, Ill., assignor to Industrial Patents Corporation, Chicago, Ill., a corporation of Delaware Application August 13, 1942, Serial No. 454,713

24 Claims. (Cl. 25—7)

This invention relates to the continuous production of a cast stick of extruded material and more particularly provides a machine to continuously cast a stick of soap which may subsequently be cut into bars or cakes of conventional size.

In the past, in the manufacture of soap, the molten product has been run into molds of proper size in which the liquid is cooled until it hardens into a solid mass. These molds have a generally flat rectangular shape and when stripped from the hardened product, leave a slab of soap that must be trimmed and cut into strips which are then cut into the bars of conventional size. The trimmings need not be wasted, but they must be reworked and the labor and energy expended in remelting and casting the soap over again, constitute a loss.

The present invention has been made to provide a machine for casting the soap directly to a finished stick form of such dimensions that it may be cut into individual bars of soap of the usual size without the necessity of trimming the stick. In its further aspects, the machine here disclosed provides improved means for extruding a molten soap product continuously into a moving molding device from which the heat is dissipated. The moving mold may have a cross-sectional area of dimensions equal to the common bar of soap so that this continuously formed stick need only be cut into bars of proper length which are then ready to be packaged.

While this invention will be explained in connection with the casting of soap, it will be obvious that other materials of a similar nature may be continuously cast to stick form by this machine. Therefore:

It is an object of this invention to provide means for continuously transforming a molten or liquid product into a relatively solid or plastic form.

It is another object of this invention to provide an improved apparatus for receiving an extruded molten soap product to cast it into a stick.

It is another object of this invention to provide an improved extrusion means for a continuous casting apparatus.

It is another object of this invention to provide a casting and cooling means of improved and adjustable construction.

It is another object of this invention to provide an automatic rack feed and cutting mechanism for severing a cast soap stick into bars and depositing the bars on a rack for further hardening.

Other objects of the invention will appear more fully below.

In the drawings:

Figure 1 is a side elevation of the machine forming the subject of this invention.

Figure 2 is a side elevation partly broken away showing the feed end of the conveyor or stick casting mechanism taken on line 2—2 of Figure 3.

Figure 3 is an end elevation of the feed end of the conveyor mechanism taken on line 3—3 of Figure 2.

Figure 4 is a side elevation partly broken away of the material reservoir and extruding nozzle.

Figure 5 is a plan view of the reservoir and nozzle shown in Figure 4.

Figure 6 is a sectional view taken on line 6—6 of Figure 5.

Figure 7 is a sectional view taken on line 7—7 of Figure 5.

Figure 12 is a plan view of the mechanism shown in Figure 11.

Figure 13 is an end view of the rack supply and cutting device taken on line 12—13 of Figure 12, and with the rack feed mechanism eliminated for clarity.

Figure 14 is a detail side view of an automatically controlled clutch mechanism.

Figure 15 is a plan view of the clutch shown in Figure 14.

Figure 16 is a plan view showing a modified extrusion means construction.

Figure 8:
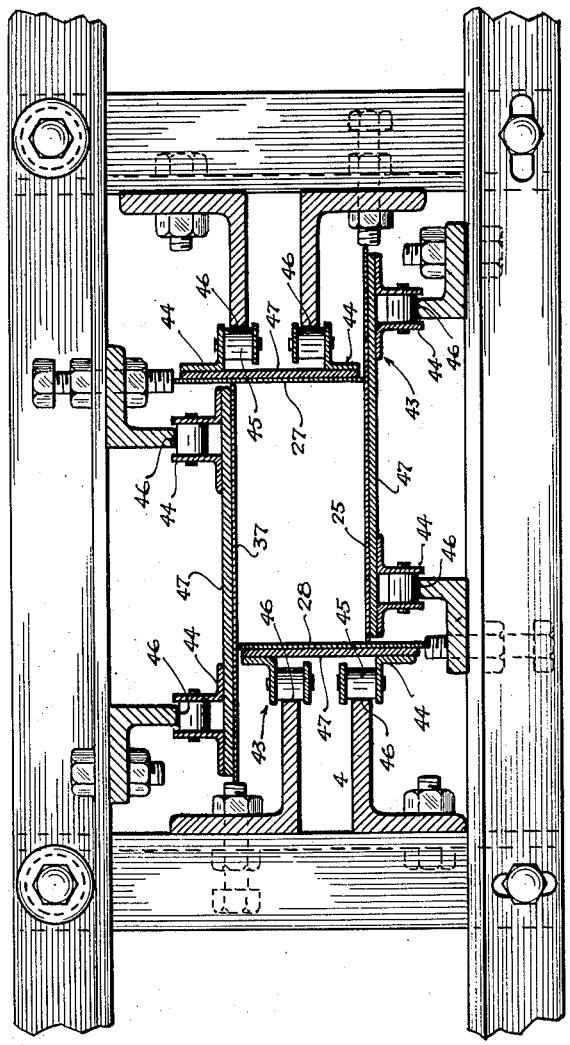
Figure 8 is a sectional view taken on line 8—8 of Figure 1.

As above stated, the machine here shown is particularly described in connection with the conversion of soap from the molten state to the solid or plastic state and provides means for receiving the soap from a molten feed means to form the soap into a solid stick. The molten soap is cooled as it moves forwardly continuously through the machine and when the soap hardens to a stick that is self-sustaining, it issues from the conveying means onto a suitable supporting means or anvil. The stick may be formed to the proper dimensions as to thickness and width so that it may be cut in lengths of just the right size to provide a conventional bar of soap. Cutting means operate upon the formed stick as it issues from the anvil to sever individual bars of soap from the stick and the bars drop onto racking means which store the bars while the hardening operation continues.

Referring to the drawings, melted soap may be placed in the reservoir 10 or other means such as a pumping device for example, to be delivered through the conduit 11 into the conveying or molding means which casts the molten soap into a stick. The soap is fed into the reservoir in the form of a relatively free flowing liquid and a sufficient charge may be stored in the reservoir 10 to run the machine for any desired period of time and in practice, preferably one charge will run the machine for eight hours.

The reservoir 10 and conduit 11 are provided with a heating means to keep the soap in a molten condition and as best shown in Figures 4 to 7, a steam jacket 12 surrounds the reservoir and conduit. A heating medium may be delivered through the pipe 13 into one side of the jacket for circulation around the conduit and reservoir under the direction of a baffle 14. The steam passing around the end of the baffle will return down the other side of the steam jacket 12 and issue through the exhaust pipe 15. Any suitable drain connection may be associated with the steam jacket to draw off any water condensing in the jacket. Also, any other heating fluid may be used to maintain the proper temperature in the soap mass.

The molten soap flows from the reservoir through the conduit 11 to the nozzle 16 for delivery to the casting means and to control the passage of the soap through the nozzle, a pressure is established over the body of molten soap. The pressure is controlled to effect the proper extrusion of molten soap depending on the characteristics of the type of soap being handled. After the reservoir has been loaded, it is sealed by cover 17 and a pressure may be created by the admission of compressed air through supply pipe 18.

The soap issues from the nozzle 16 into the forming conveyor or mold generally indicated as 20 (Figure 1) and the nozzle may be provided with suitable packing means as the flexible band 21 to engage the walls of the mold to seal the nozzle with respect to the mold.

The mold 20 collects the molten soap flowing from the nozzle 16 and progresses continuously with the extruded soap to support and shape it as it hardens to a more solid form. This moving mold may take the form of two pairs of opposed endless belts travelling around suitable roller supports. These belts should be made of a flexible material having good qualities for heat conduction such as metal and the disposition of the belts one with respect to the other is best shown in Figure 3. It is seen that each one of the four belts has its face in contact with the edge of an adjacent belt, for a purpose that will appear below, and the arrangement provides a tunnel of rectangular shape. In this construction the bottom belt 25 is mounted for movement longitudinally of the machine over the wheels 26 carried in suitable bearings fixed to the frame of the machine.

The belts 27 and 28 forming the sides of the conveying mechanism are both mounted adjustably with respect to the bottom belt 25 and the side belt 27 shown on the right in Figure 3 is adjustable horizontally as shown by the double headed arrow while the side belt 28 on the left is adjustable vertically as shown by the double headed arrow. The side belt 27 is mounted to have its lower edge engaging the face of the bottom belt 25 and it is supported for movement lengthwise of the machine around the wheels 29 one of which is disposed at each end of the machine (see Figure 10). Each of the wheels 29 is supported on an axle 30 carried in a bearing 31 which in turn is mounted for selective adjustable movement horizontally in a slot 32 in the frame of the machine to fix the belt 27 in any desired position across the face of the bottom belt 25.

Figure 10:
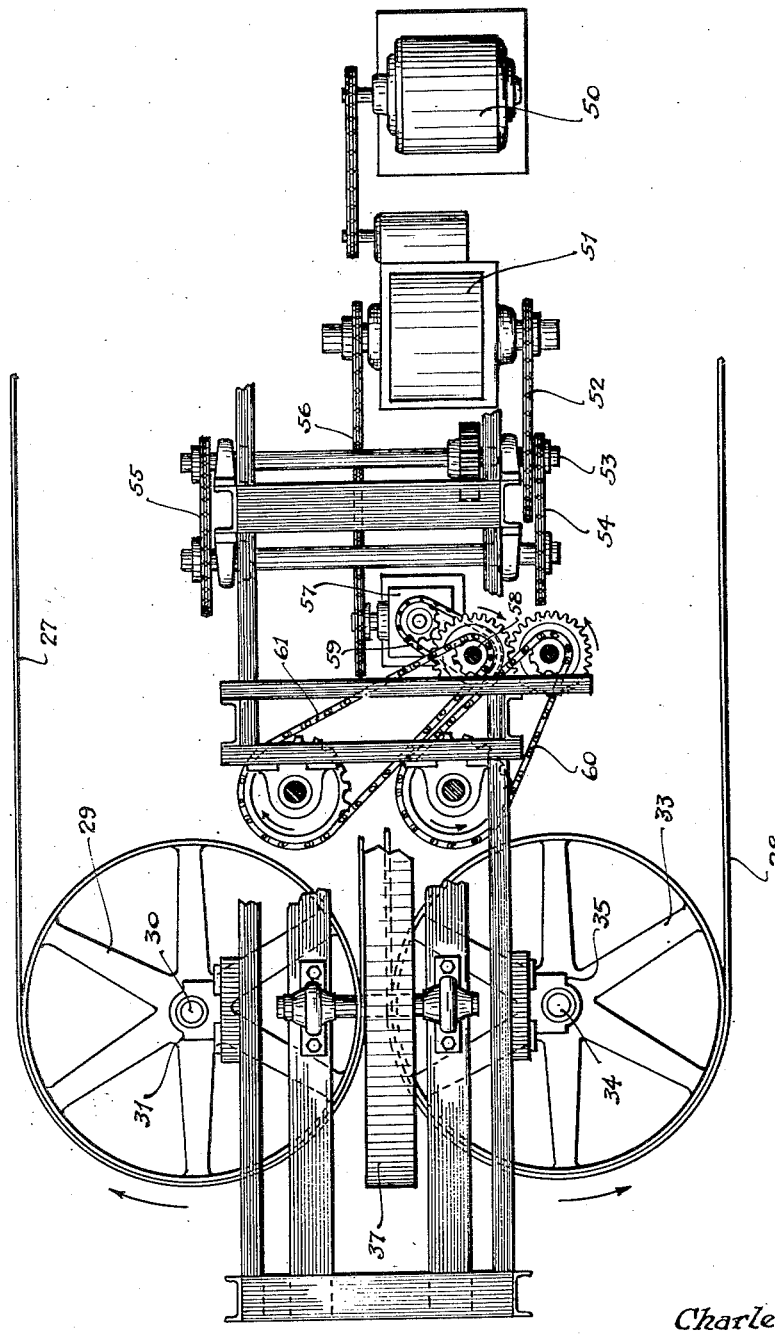
Figure 10 is a plan view partly broken away of the conveyor drive mechanism shown in Figure 9.

The left side belt 28 is supported for movement longitudinally of the machine on wheels 33, one of which is shown in Figure 10, and the wheels 33 are carried by the axles 34 supported in suitable bearings 35. The bearings 35 are mounted in the frame of the machine for adjustment vertically through slots 36, and hold the face of the belt 28 in engagement with the left edge of the bottom belt 25, as shown in Figure 3.

The upper belt 37 is disposed to cover the channel formed between belts 25, 27, and 28 and the right edge of the upper belt (Figure 3) engages the face of belt 27 and the face of the upper belt 37 engages the upper edge of the other side belt 28. The belt 37 is mounted over suitable wheels 38 (Figures 2 and 3) carried on axles 39 and the axles are carried in bearings such as 40 which are mounted on the frame for adjustment both vertically and horizontally in the direction of the arrows shown in the upper left corner of Figure 3. This adjustment may be accomplished by the movement of clamping bolts 41 of the bearings in apertures 42 in the frame. It will be seen, with this conveyor structure, that a space is provided between the four conveyors into which the molten soap may flow and the surfaces of the conveyors forming the tunnel all move forwardly simultaneously. The molten soap which has been run into the mold is cooled as the heat being transmitted through the metallic belts is dissipated in the atmosphere surrounding the conveyor and the molten soap is thus hardened to stick form. The conveyor is of such length and runs at such a speed that the molten soap is cooled and is thus transformed from its molten state, at the inlet end of the conveyor mechanism, to a plastic or solid condition at the outlet end, in which condition the soap has sufficient body to fully support itself. If necessary, a greater cooling could be effected by positively circulating a cooling medium around the belt.

The conveyor mechanism has been made adjustable as above described in a manner whereby the position of certain of the belts may be changed to vary the cross section of the tunnel in order that the dimensions of the stick of soap being formed may be altered. The conveyor or belt 27 may be moved, for example, to the right as shown in Figure 3 and the conveyor 37 may also be moved to the right to close the space thus left. This adjustment would increase the molding tunnel in the dimension of its width. If it were also desired to increase the depth of the stick, the conveyor 37 could be raised and conveyor 28 adjusted vertically against the face of conveyor 37 to complete the adjustment for depth. All of the bearings supporting these conveyors have therefore been made adjustable in the directions named to provide a mold structure adaptable to the production of any ordinary sized soap bar.

The speed at which the conveyor belts are driven controls the volume output of the machine and if they are driven more rapidly it is obvious that the output is increased. The length of the conveyor device must be such as to insure a proper cooling of the molten product in the mold, and when the speed is increased, the length must be increased and, in practice the length is such that the flexible metal belts must be supported by suitable means to prevent any outward bulging thereof which would distort the final product. To support the conveyor belts as they travel longitudinally through the machine, the rigid backing belts generally denoted 43 in Figure 2 have been provided to engage each of the flexible mold belts 25, 27, 28 and 37.

Each of the belts 43 comprises a pair of chains 44 (Figure 8) mounted in parallel relationship and the chains are provided with suitable rollers 45 affixed thereto each of which rides against a continuous track 46 fixed to the frame of the machine. On the opposite faces of the chains, and disposed to cooperate with the flexible mold belt, are the rigid flight members 47 which support the belt transversely of its length. The flights 47 are spaced a convenient distance apart and are of such length as to be coextensive with the width of its corresponding belt. The backing belts 43 and their tracks 46 are each mounted to be adjustable with the mold belts.

The backing belts 43 are of endless structure and are driven to move with the mold belts which themselves are in contact with the stick of soap being cast. Backing belts 43 have sufficient frictional contact with the mold belts to drive them, but if it is found desirable to drive the individual mold belts, this may be done in any well known manner. With this construction, any force tending to buckle the conveyor belts will be transmitted to the flights 47 and, as best shown in Figure 8, the flights 47 are rigidly supported from the track members 46 adjustably secured to the frame of the machine and in this manner the mold belt is supported so that it cannot expand or bulge to permit a distortion of the stick being cast.

Figure 9:
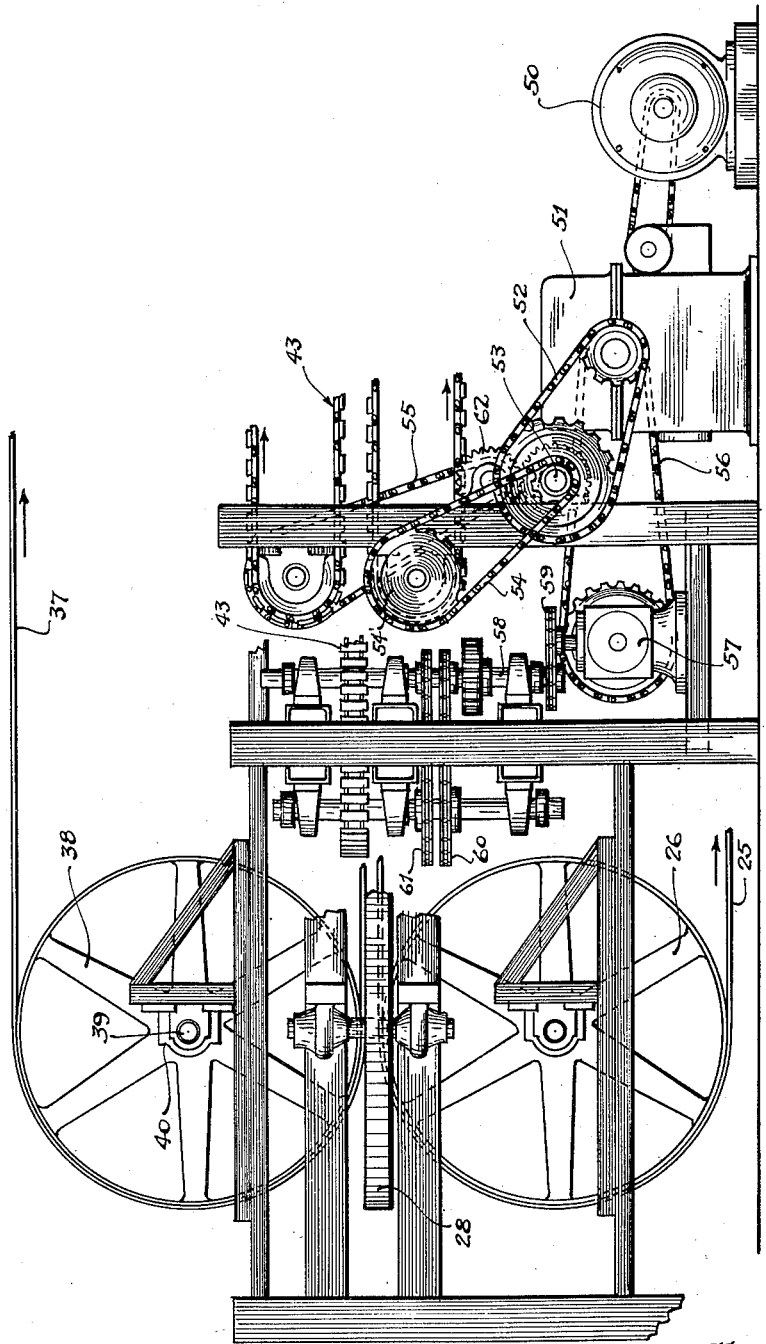
Figure 9 is a side elevation partly broken away showing the drive mechanism for the conveyor device.

A driving means for the backing belts 43 is shown in Figures 9 and 10. A motor 50 is shown for driving the speed reducer 51 and the output of the speed reducer is delivered through the chain 52 to the shaft 53 which, through the chain 54, drives the sprocket wheel 54' cooperating with the backing belt under conveyor 25. Shaft 53 drives the reversing gear 62 that drives the chain 55 to transmit motion to the backing belt 43 which cooperates with the upper conveyor belt 37.

The variable speed reducer 51 driving through the chain 56 drives the mitre gears 57 and the output of the mitre gears drives the chain 59 to rotate the vertically disposed shaft 58. The backing chains 43 disposed to cooperate with side mold belts 27 and 28, are driven from the shaft 58. The backing belt behind conveyor 27 is driven by chain 60 and the backing belt behind the conveyor 28 is driven from shaft 58 through the reversing gear 63 and chain 61. All of the backing belts 43 are driven at the same speed and through this drive system all four sides of the conveyor device are made to move along together. It is obvious that the conveyor belts 25, 27, 28 and 37 could be driven directly from this drive mechanism if desired, and if such practice is followed another form of backing means, such as fixed rollers engaging the belts could be used.

The soap is delivered from the supply means in the form of a liquid into the space between the belts and when the reservoir 10 is used, the air pressure maintained in the reservoir over the body of liquid is sufficient to force the molten soap into the tunnel provided between the mold belts to fill every portion of the space. After the machine has been started in operation, the hardened stick approaching the outlet end of the conveyor device will form a plug to prevent the molten soap from flowing rapidly through the molding tunnel and thus a continuous back pressure is maintained at the outlet of the extrusion nozzle.

With light or soft toilet soaps, a pressure of one or two pounds per square inch may be sufficient to cause the soap to fill all portions of the mold, but with heavier laundry soaps a pressure of as high as from eight to ten pounds per square inch may be required.

Figure 11:
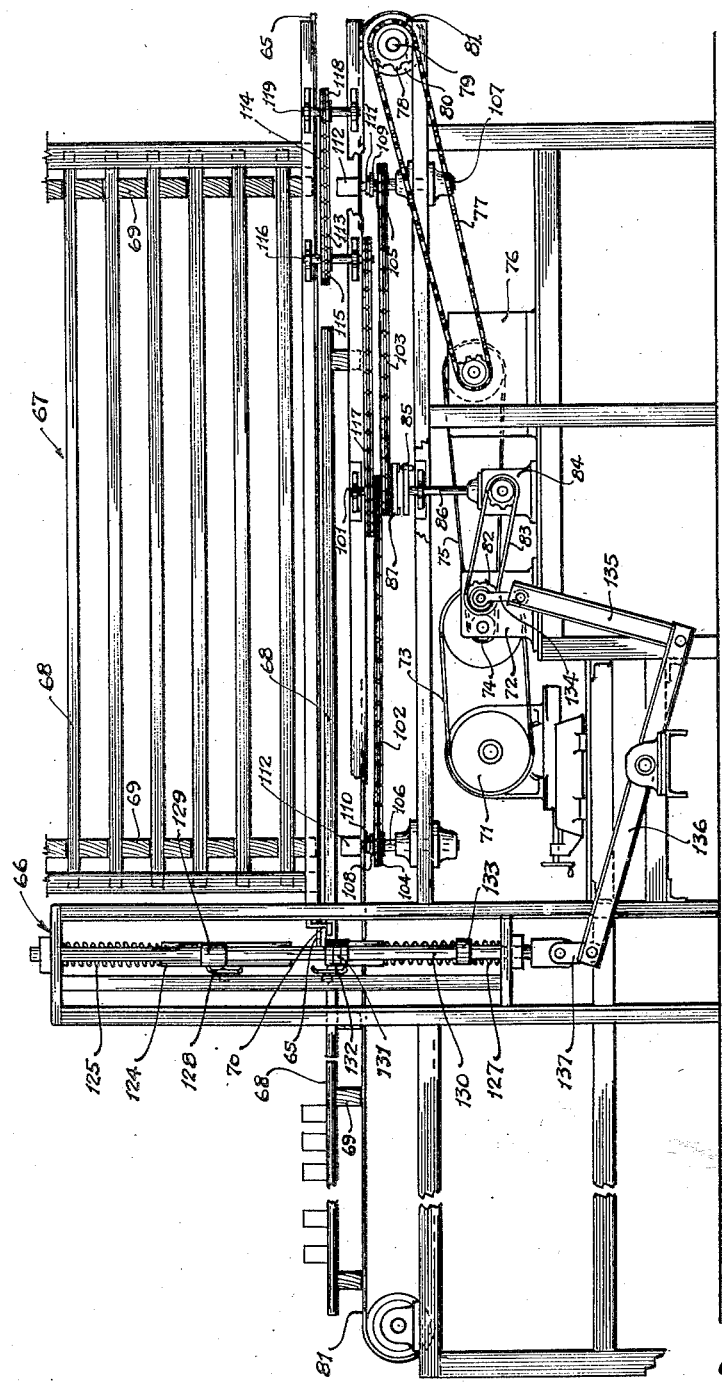
Figure 11 is a side elevation of a rack feed mechanism and cutting device.

As the soap is conveyed along it is progressively changed from a liquid to a relatively hard plastic mass by the loss of heat through the conveyor belt. Thus it is important that the conveyor belt transmit heat efficiently. When the soap extruded into the conveying means has been cooled to form a relatively rigid plastic mass, the formed stick may be discharged from the conveyor device and it issues from the conveyor onto a supporting plate or anvil 65 (Figures 11 and 12). The soap, as shown in Figure 11, passes over the upper surface of plate 65 and the cast stick has sufficient rigidity that it pushes straight forwardly over the anvil to be projected through a cutting means generally denoted 66 (Figure 11).

Between the outlet of the conveyor and the cutting device 66 is disposed rack feed means 67 which is designed to feed the lowermost rack from the series of racks 68 onto a conveyor 81. Means are also provided to deliver this rack newly placed on the conveyor from a position under the plate 65 into proper position below the cutting device 66 to receive bars of soap as they are severed from the cast stick. The blocks of soap are disposed on the racks 68 in spaced relation whereby the filled racks may be placed in a suitable atmosphere to complete the hardening operation.

Each one of the racks 68 is provided with a pair of spacing means 69 disposed at opposite ends of the under side of the rack and the filled racks may, when loaded, be placed one on top of the other in the drying chamber to conserve space. The cut bars of soap are deposited on the upper surface of the rack, but both ends of each rack are left free so that the spacing means 69 of another rack may be fitted into position without disturbing the arrangement of the bars of soap on the rack. To effect this spacing, the racks are delivered from the under side of the plate 65 in a manner to initially space the first bar of soap to be deposited on the rack, a distance away from that end sufficient to permit the spacing block 69 of another rack to fit onto the rack being then filled.

This rack being filled, is continuously driven from under the plate 65 and cutting means 66, at a slightly faster velocity than the rate of delivery of the formed soap stick from the conveyor in order that, as the bars of soap are cut from the stick and are deposited on the rack, they will be spaced somewhat from each other. After the rack has passed lengthwise under the cutting means and has been filled, a feeler 70 in contact with the edge of the rack completes an electrical circuit or through other means, renders the rack feed device operative to place another rack in position to be filled.

The feed movement of the incoming empty rack is transmitted to the filled rack to move it from under the cutting means so that a space is left on the end of the filled rack to accommodate a spacer 69.

The motive force for feeding the racks is supplied from a constantly running motor 71 and a one revolution clutch under control of the feeler 70 operatively connects the feed mechanism to the motor. The motor drives the reducing gears 72 through belt 73 and the reducing gears drive two sprockets 74 and 82. The output sprocket 74 drives chain 75 which drives the reducing gears 76, the other output, sprocket wheel 82, drives chain 83 and mitre gears 84. The reducing gears 76 drive the chain 77 which in turn drives the sprocket wheel 78. The sprocket is fixed to the axle 79 and the drum 80 keyed to the axle drives the conveyor belt 81. Mitre gear 84 drives one side 85 of the one revolution clutch, the mitre gears rotating shaft 86 to which the clutch plate 85 is fixed.

The conveyor belt 81 is positioned under anvil 65 to receive the empty racks and engages the under side of the spacing device 69 of the racks 68 to carry the racks forwardly from under the anvil and cutting means 66. The continuous motion of the motor 71 is geared down through the gear trains shown to drive the belt 81 at a speed slightly faster than the speed of movement of the soap stick being formed in the machine as explained above.

The driving side 85 of the one revolution clutch is connected to the driven side 87 through the sliding pin 88 mounted in the driving disc 85 (Figure 14), the pin engaging behind a lug 89 integral with the driven disc 87 to lock the discs together. The pin 88 may be easily shifted from a position in engagement with the lug to a position out of engagement therewith and the pin is provided with suitable depressions which cooperate with the spring pressed detent 96, to hold the pin in either one of its positions until it is positively driven to the other position.

The position of the sliding pin 88 is controlled by a pair of angularly disposed cam arms 90 and 91 both of which may be integrally secured to the rotatably mounted cross member 92. The cross member 92 has a lever arm 93 fixed thereto, the lever arm 93 normally being urged upwardly by a spring 94 (Figure 15). As the arm 93 moves upwardly, the cam arm 90 is moved downwardly, as is also the arm 91, and the arm 90, in its lowermost position, may engage a cam surface 88' on the pin 88 to withdraw it from engagement with the lug 89 on plate 87 as the pin carried by clutch plate 85 moves past the arm.

To effect a driving connection between plates 85 and 87 through pin 88, the cam arms are rotated in the opposite direction by the lever arm 93 which is operatively connected with the core of a solenoid 95 and when the solenoid is energized, the arm 93 is drawn downwardly against the tension of spring 94. As the arm 93 moves downwardly, the cam arm 90 is lifted out of a position where it may engage the cam surface 88' on pin 88 and the cam arm 91 is rocked upwardly into position where it may engage another cam surface 91' on the pin 88 to drive the pin inwardly so that as the plate 85 carries the pin around, the pin will engage with the lug 89 on the driven disc 87 of the one revolution clutch so that the two rotate as a unit until the pin 88 is disengaged from behind lug 89.

The solenoid 95 is connected in a circuit which is controlled by the feeler 70 and as shown in Figure 15, the feeler is normally urged to rotate in a counterclockwise direction by a spring 97 fixed to the frame of the machine. The feeler is pivotally mounted on the frame of the machine with its outer end positioned to engage one side of a rack being filled (Figure 12) and at its inner end, the feeler is provided with a laterally extending arm 98 which engages the movable arm 99 of the contacts 100. The arm 99 is normally biased to make contacts 100 but may be moved by arm 98 to break the circuit through the contacts.

When a rack is in position under the cutter such that it is being properly loaded with bars of soap being cut from the extruded stick, the feeler engages the side of the rack 68 and is held in the dotted line position shown in Figure 14 so that the arm 98 opens the contacts 100 whereby the solenoid 95 is de-energized and the arm 93 will be raised by spring 94. This places the arm 90 in position to withdraw the pin 88 from engagement with the lug 89 to unclutch the feed mechanism thus rendering it inactive. As soon as a rack has been completely loaded, the end of the rack will release the feeler 70 and spring 97 will draw it to the full line position shown in Figure 15 whereby the arm 98 will permit the arm 99 to make the contacts 100 to energize the solenoid 95. When the solenoid is energized, the arm 93 will be drawn downwardly to raise the cam arm 91 into position to drive the pin 88 into engagement with the lug 89. The driven plate 87 of the cam receives motion from the driving plate 85 in this manner and the shaft 101 is thus driven.

The driven shaft 101 is connected with suitable feed mechanism to remove a rack from the supply and index it forwardly into position to push the filled rack from under the severing means and to put the empty rack in position to be loaded. This mechanism has been designed to drive a rack into position under the cutting means while shaft 101 makes one revolution. When the rack feed mechanism has been energized, the rack being fed into position is driven forwardly and will engage the feeler 70 to open the circuit through solenoid 95 thus releasing the arm 93 so that the cam arm 91 will be driven into position by the spring to withdraw the pin 88 from contact with the lug 89.

The mechanism for withdrawing a rack from the supply and feeding it onto the belt 81 is driven from shaft 101 by chains 102 and 103. These chains drive sprocket wheels 104 and 105 affixed to shafts 106 and 107 respectively. Affixed to the upper end of the shafts 106 and 107 are the crank arms 108 and 109 which are driven with the shafts and the arms 108 and 109 are connected through the links 110 and 111 to the pushers 112 which engage behind the spacing means 69 of the lowermost rack in the rack supply. As the cranks 108 and 109 rotate, the links 110 and 111 and pushers 112 pull the lowermost rack 68 onto the belt 81. When the crank arms 108 and 109 have been rotated through 180° from the position shown in Figure 12 the rack will be in proper position on the belt 81 whereupon a lug 113 fixed to the endless chain 114 engages behind the rack 68 to index it forwardly.

The indexing chain 114 is driven from sprocket 115 fixed to shaft 116 and this shaft is driven from shaft 101 by chain 117. The indexing chain is stretched longitudinally of the machine and is carried at one end around the idler sprocket 118 that is rotatably supported on shaft 119. The idler end of the chain is disposed to bring lug 113 up behind a rack 68 just as soon as it is moved onto belt 81 and as the belt is driven in a counterclockwise direction (Figure 12), the empty rack is pushed forwardly and is driven to engage the rear end of the filled rack to push the filled rack from under the cutting means while the empty rack is being moved into position.

The lug is timed to engage the empty rack to drive the two abutting racks forwardly a distance to space the last bar deposited on the filled rack, a distance from the end of that rack, such that when the filled racks are piled one on top of the other, the spacing means 69 may engage the rack next below it. The indexing means also delivers the empty rack into such a position that the first bar to be deposited on the empty rack will be spaced a sufficient distance from its end to permit a spacing means 69 to engage that rack. When the empty rack 68 has been pushed into this position, the lug 113 is carried by the chain 114 around drive sprocket 115 to be in position for the next cycle. Indexing chain 114 should make one revolution for each rack feeding cycle. As soon as an empty rack has been withdrawn from the series of racks and pushed forwardly into position under the cutting means, the feeler 70 will be driven to the position that causes the one revolution clutch to be disengaged. It will be noted that the cutter is operated continuously during any rack feeding cycle and the cycle must be performed rapidly and timed to take place between the successive strokes of the cutting means. The driving plate 85 is intergeared with the motion of the means for severing bars of soap from the cast stick so that a rack will always be fed under the severing means to receive the bar properly.

Whenever a rack has been completely filled the feeler mechanism initiates another rack feeding cycle to position another empty rack under the cutting means.

As stated above, the continuous and rigid plastic stick of soap is delivered over the anvil 65 and the rack 68 is delivered from under the anvil 65. A cutting means has been provided to reciprocate vertically against the end of the cast stick to carry a wire completely through the stick to sever bars of soap from the stick. However, the free end of the anvil cooperates with the wire cutting device to support the stick during the cutting operation and as the plate or anvil 65 is relatively thin the severed bar of soap drops very lightly onto the rack 68 without injury to the bar.

The cutting means is shown in Figure 13 wherein it is seen that a wire 120 is reciprocated vertically with a frame 121 and a severance of the stick results as the wire moves in each direction. The frame is of such a shape as to straddle the cast stick and is guided in vertically disposed slide bearings with a drive collar 122 rigidly connected to one side thereof. The collar 122 slides on the vertical bearing 123 but has a sufficiently tight engagement that it will not slide unless driven. The collar 122 is engaged by the pusher 124 driven by the spring 125 whereby frame 121 is driven downwardly and is engaged by the pusher 126 driven by the spring 127 to drive frame 121 upwardly. As shown in Figure 13, the spring 125 has been compressed and is held in this condition by a trigger 128 which is about to be engaged by a collar 129 fixed to the reciprocating drive rod 130. The spring 125 in expanding will drive the pusher 124 downwardly to force the collar 122 before it. Collar 122 and frame 121 integral therewith will carry the wire 120 through the cast soap stick to sever a bar from the end thereof.

The frame 121 is driven downwardly by spring 125 when the spring 127 has been almost completely compressed by the drive shaft 130. The lug 131 on shaft 130 engages the pusher 126 to drive it down to compress the spring. The trigger 128 is not operated to release spring 125 until spring 127 has been almost completely compressed so that pusher 126 will not interfere with the movement of collar 122. The spring 127 is compressed until pusher 126 is latched behind the trigger 132, the spring remaining compressed until drive shaft 130 is raised to partially compress spring 125 and then trigger 132 is released by collar 133 fixed to the drive shaft.

The tripping of trigger 132 releases compressed spring 127 to drive the frame 121 upwardly and the stick of cast soap is again cut.

As soon as either of the springs are compressed, the motion of the drive shaft 130 is reversed and the lug 131 is reciprocated into engagement with the other of said pushers to compress the spring behind it. At a fixed point in each compression cycle, the previously compressed spring 125 or 127 is released to drive the frame and cutting wire to effect a cutting of the extruded stick. The collars 129 and 133 are disposed on the shaft 130 to release the triggers in properly timed relation with respect to the movement of the cast soap stick such that a bar of proper size is severed from the stick.

The reciprocating drive shaft 130 is continuously driven from the motor 71 which drives the speed reducer 72 as stated. The speed reducer drives a crank 134 and the crank 134 drives the link 135 which is connected to the lever 136. Lever 136 may be connected to the drive shaft 130 through the link 137. With this construction, the rotary motion of the motor is converted into a reciprocating motion and the continuous reciprocation of the drive shaft 130 is utilized to drive the intermittently acting cutting means as described.

The racks, filled as they pass under the cutting means, may be lifted from the machine and stored in an appropriate atmosphere until the bars of soap are ready for further processing or packaging.

The above described machine may be used to cast any type of molten soap into a stick form and the stick may then be severed to provide bars of predetermined size. After the soap has been manufactured according to any of the usual methods and is ready to be hardened into the final product, the molten soap stock is delivered to the reservoir 10. As soon as a sufficient charge has been placed in the reservoir and a pressure established over the body of liquid, a dam or plug is inserted between the conveyor belts and at the end of the extrusion nozzle. The plug is of such size as to just fill the tunnel provided between the conveyor belts and is held fixed with respect to the conveyor belts forming the tunnel as they are driven longitudinally along the machine.

Molten soap will issue through the passage 11 to the nozzle 16 to flow into the tunnel and the dam will prevent the molten soap from flowing too rapidly through the tunnel. The molten soap will be solidified in its passage through the machine and when the dam reaches the outlet end of the tunnel, the product will have been hardened into a plastic stick. The dam may then be removed and the machine will continue in operation, the solid stick forming the dam thereafter to prevent the molten soap from running directly through the tunnel.

As previously stated the machine here disclosed will handle any of the ordinary types of soaps which may be cast, and any form of liquid soap which may be hardened or a molten soap may be delivered into the conveyor structure. The molten soap should be supplied at a temperature just sufficiently elevated above the range of the temperatures at which it begins to solidify so that the molten soap will flow neatly into the molding tunnel to fill it whereupon it may then be cooled to a homogeneous mass. If the fluid soap does not have the proper viscosity when it is extruded into the molding tunnel, while the soap might be forced into the conveyor mold to fill it, the mass may solidify to have cracks or planes of weakness therein. However, when the fluidity of the mass is controlled by maintaining the temperature of the inflowing soap to be just above the range at which the mass begins to solidify, the molten soap will flow neatly into the mold and will be cooled with a minimum heat transfer during the passage of any portion of the mass through the conveyor device. The resulting product will then have a uniform texture throughout the body.

This machine may be used with all the different types of soap, i. e., with the lighter toilet soaps through the entire range to the heavier laundry soaps, and to accomplish the best feeding action depending on the type, the pressure on the stock maintained in the reservoir or delivered into the extruding nozzle, is varied. With the lighter aerated toilet soaps, a pressure in the order of 2 pounds per square inch has been found to be sufficient to force the liquid stock into the molding tunnel. When handling soaps approaching the heavier laundry soaps, pressures as high as 10 pounds per square inch may be required.

It is well known that aerated toilet soaps shrink upon being cooled to a solid mass and to compensate for this shrinkage in order to obtain a perfect molding, an adjustment of the molding tunnel must be made such that the cross-sectional area of the molding tunnel decreases as the soap mass progresses longitudinally therethrough. With a construction such as here shown, this is easily obtained and the conveyors 27, 28 and 37 (see Figure 3) may be adjusted to decrease the cross-sectional area of the mold tunnel at the outlet end. The relatively long passage of the tunnel permits the flexible forming belts to adjust themselves to any slight distortions thus established and the backing chains 44 insure that the endless molding belts are maintained at substantially right angles with respect to each other.

The change in cross-sectional area of the tunnel of course must be adjusted to be just equal to the decrease in volume which is encountered in cooling the aerated soap whereby the material fed into the molding tunnel is continuously engaged by the walls of the tunnel to properly shape it.

The heavier soaps which have not been aerated, do not shrink substantially in cooling and therefore this adjustment need not be made in handling soaps of this type. With these soaps, the elimination of the minute air bubbles which contract or expand with variations in temperature, removes the problem occasioned by the contraction found in aerated soaps and thus the laundry soaps do not change materially in volume upon being cooled. With the non-aerated soaps in general the cross-sectional area of the tunnel may be maintained substantially constant throughout its length.

With certain types of soaps, notably laundry soaps having the usual fillers of silicate of soda or soda ash, it has been found that the final product may have streaks in it and to avoid this effect, a modified extrusion nozzle such as is shown in Figure 16 may be provided. In this modified construction, a mixing means is disposed immediately adjacent the nozzle 16 and preferably in the end of the passage 11. As here shown, a plate 140 having a centrally disposed aperture 141 therein is fixedly positioned in the passage. Extending entirely through the passage 11 and through the wall on the inlet side of the passage 11, is a drive shaft 142 to one end of which is connected a driving pulley 143 (Figure 4) whereby the shaft may be rotated. The other end of the shaft passes through aperture 141 and has a disc 144 integral therewith to rotate with the shaft. The shaft may be supported in suitable bearings and the plate is generally centered relatively with respect to the aperture 141.

In this modified extrusion nozzle, the molten soap will flow through the outlet passage 11 toward the nozzle 16 and will issue through the aperture 141 and flow through the space 145 provided between the plate 144 and wall 140. The rotation of the plate will aid the molten soap in flowing through space 145 by throwing it outwardly with centrifugal force while at the same time agitating the fluid stream. This agitation overcomes the tendency of the fillers to separate out and otherwise produces a more uniform mixture at the outlet of the nozzle. The molten soap after being thoroughly mixed will then flow around the periphery of the plate 144 and out the nozzle 16 into the tunnel.

Due to the relatively slow velocity of the stream of molten soap through the passage 11, relatively little friction is encountered by subjecting the soap to this tortuous passage and a thorough and efficient mixing is thus obtained just before the molten product is placed on the cooling conveyor so that all possibility of streaking is eliminated. Furthermore, it has been noted that when aerated soaps are forced through an agitating means such as is here disclosed, that the air bubbles are more evenly distributed throughout the final product.

As stated above, the invention may be used with other products having physical characteristics that are somewhat similar to those of a molten soap. Also, various elements or sub-combinations of this machine may have more general applications. Undoubtedly, modifications of various parts of this machine will occur to those skilled in the art, all of which are contemplated to be within the scope of the following claims.

I claim:

1. A machine for solidifying and stacking a material that may be extruded and solidified comprising means to extrude said material, and means to receive and support the extruded material while it is solidifying, means for feeding a rack into position to receive the solidified material, means to automatically feed a second rack into said position as the preceding rack is filled, means to sever the extruded stick, and means to feed a rack past the severing means whereby the severed product may be placed on the rack.

2. A machine for solidifying and stacking a thermoplastic material that may be extruded comprising means to extrude the material, a reservoir including heating means to maintain the material therein in liquid form, means to receive and support the extruded material while it is solidifying, a rack supplying means, a rack mounted in said supplying means for movement into proximity to said receiving means, means for feeding said mounted rack into position to receive the solidified material, means to automatically effect the feeding of a second rack into said position as the preceding rack is filled, means to sever the extruded stick, and means to feed said racks from said position past the severing means whereby the severed product may be placed on the rack.

3. A machine for solidifying a fluid material that may be extruded and solidified comprising means to supply the material in liquid form, extruding means to receive the liquid, means to maintain a constant pressure on the liquid being forced through the extruding means, means to receive and support the extruded material while it is solidifying, a rack supplying means, a rack mounted in said supplying means for movement into proximity to said receiving means, means for feeding said mounted rack into position to receive the solidified material, means to sever the solidified stick, and means to feed said rack from said position past the severing means whereby the severed product may be placed on the rack.

4. A machine for solidifying a fluid material that may be extruded and solidified comprising means to supply the material in liquid form, extruding means to receive the liquid, means to maintain a constant pressure on the liquid being forced through the extruding means, means to receive and support the extruded material while it is solidifying, a rack supplying means, a rack mounted in said supplying means for movement into proximity to said receiving means, means for feeding said mounted rack into position to receive the solidified material, means to automatically effect the feeding of a second rack into said position as the preceding rack is filled, means to sever the solidified stick, and means to feed said racks from said position past the severing means whereby the severed product may be placed on the rack.

5. A machine for solidifying and stacking a thermoplastic material that may be extruded comprising means to maintain a supply of the material in liquid form, extruding means to receive the liquid, heating means to maintain the material in liquid form, means to maintain a constant pressure on the liquid being forced through the extruding means, means to receive and support the extruded material while it is solidifying, a rack supplying means, a rack mounted in said supplying means for movement into proximity to said receiving means, means for feeding said mounted rack into position to receive the solidified material, means to sever the solidified stick, and means to feed said rack from said position past the severing means whereby the severed product may be placed on the rack.

6. A machine for solidifying and stacking a thermoplastic material that may be extruded comprising means to maintain a supply of the material in liquid form, extruding means to receive the liquid, heating means to maintain the material in liquid form, means to maintain a constant pressure on the liquid being forced through the extruding means, means to receive and support the extruded material while it is solidifying, a rack supplying means, a rack mounted in said supplying means for movement into proximity to said receiving means, means for feeding a rack into position to receive the solidified material, means to automatically effect the feeding of a second rack into said position as the preceding rack is filled, means to sever the solidified stick, and means to feed said racks from said position past the severing means in succession whereby the severed product may be placed on said racks respectively.

7. A machine for solidifying and stacking a material that may be extruded and solidified comprising means to extrude the material, and walled means to receive and support the extruded material while it is solidifying to continuously cast the material into a stick form, at least one of the walls of said receiving and supporting means being adjustable laterally with respect to said extruding means whereby the cross-sectional area of the stick being extruded may be varied, means for feeding a rack into position to receive the solidified material, means to sever the solidified stick, and means to feed the rack past the severing means whereby the severed product may be placed on the rack.

8. A machine for solidifying and stacking a material that may be extruded and solidified comprising means to extrude the material and walled means to receive and support the extruded material while it is solidifying to continuously cast the material into a stick form, at least one of the walls of said receiving and supporting means being adjustable laterally with respect to said extruding means whereby the cross-sectional area of the stick being extruded may be varied, means for feeding a rack into position to receive the solidified material, means to automatically feed a second rack into position as the preceding rack is filled, means to sever the solidified stick, and means to feed a rack past the severing means whereby the severed product may be placed on the rack.

9. A machine for solidifying and stacking a material that may be extruded and solidified comprising means to extrude the material and walled means to receive and support the extruded material while it is solidifying to continuously cast the material into a stick form, at least one of the walls of said receiving and supporting means being adjustable laterally with respect to said extruding means whereby the cross-sectional area of the stick being extruded may be varied, means for feeding a rack into position to receive the solidified material, means to sever the solidified stick, and means to feed the rack past the severing means whereby the severed product may be placed on the rack.

10. A machine for solidifying and stacking a material that may be extruded and solidified comprising means to extrude the material, and walled means to receive and support the extruded material while it is solidifying to continuously cast the material into a stick form, at least one of the walls of said receiving and supporting means being adjustable laterally with respect to said extruding means whereby the cross-sectional area of the stick being extruded may be varied, means for feeding a rack into position to receive the solidified material, means to automatically feed a second rack into position as the preceding rack is filled, means to sever the solidified stick, and means to feed a rack past the severing means whereby the severed product may be placed on the rack.

11. A machine for solidifying a material that may be extruded and solidified comprising means to extrude said material, and means to receive and support the extruded material while it is solidifying to continuously cast the material into stick form, said receiving and supporting means including a plurality of relatively flexible endless belts, backing means to support said belts, said backing means being driven and engaging said belts to carry the endless belts forwardly through the machine, means to sever the solidified stick, and means to receive the severed product.

12. A machine for solidifying and stacking a material that may be extruded and solidified comprising means to extrude said material, and means to receive and support the extruded material while it is solidifying to continuously cast the material into stick form, said receiving and supporting means including a plurality of relatively flexible endless belts, backing means to support said belts, said backing means being driven and engaging said belts to carry the endless belts forwardly through the machine, a rack supplying means, a rack mounted in said supplying means for movement into proximity to said receiving means, means for feeding said mounted rack into position to receive the solidified material after severing, means to sever the solidified stick, and means to feed said rack from said position past the severing means whereby the severed material may be placed on the rack.

13. A machine for solidifying and stacking a material that may be extruded and solidified comprising means to extrude said material, and means to receive and support the extruded material while it is solidifying to continuously cast the material into stick form, said receiving and supporting means including a plurality of relatively flexible endless belts, backing means to support said belts, said backing means being driven and engaging said belts to carry the endless belts forwardly through the machine, a rack supplying means, a rack mounted in said supplying means for movement into proximity to said receiving means, means for feeding said mounted rack into position to receive the solidified material after severing, means to automatically effect the feeding of a second rack into position as the preceding rack is filled, means to sever the solidified stick, and means to feed said racks from said position past the severing means whereby the severed product may be placed on the rack.

14. A machine for solidifying a material that may be extruded and solidified, said machine having a frame and comprising means to extrude said materials, and means to receive and support the extruded material while it is solidifying whereby to continuously cast the material into stick form, said receiving and supporting means including a plurality of relatvely flexible endless belts, said belts being disposed to have the face of each engage the edge of an adjacent belt, and bearing means for supporting said belts, said bearing means being carried by said frame and being adjustable laterally with respect to said extruding means so that the cross-sectional area of said stick may be varied.

15. A machine for solidifying a material that may be extruded, means to extrude the material, said machine having a frame and comprising two pairs of opposed endless belts to receive and support the extruded material while it is solidifying whereby to continuously cast the material into stick form, each of said belts being disposed with the face of one belt in contact with the edge of another belt, and bearing means for supporting said belts, said bearing means being carried by said frame and adjustable so that the cross-sectional area of said stick may be varied.

16. A machine for solidifying and stacking a material that may be extruded and solidified comprising means to extrude said material, and means to receive and support the extruded material while it is solidifying, a rack supplying means, a rack mounted in said supplying means for movement into proximity to said receiving means, means to feed said mounted rack into position to receive the solidified material passing from said receiving and supporting means, means to automatically effect the feeding of a second rack into said position as the preceding rack is filled, means to sever the extruded stick whereby the severed product may be placed on said racks, said racks being provided with spacing means disposed adjacent their ends so that the filled racks may be placed one on top the other, means to feed said racks from said position past the severing means, said feeding means including means to effect such a movement of the rack being filled as to provide a spacing of the cut material being deposited on the racks with the articles disposed a substantial distance inwardly from each end of the rack whereby the spacing means of one filled rack may contact the upper surface of another filled rack so that the filled racks may be stacked one on top of the other.

17. A machine for solidifying and stacking a material that may be extruded and solidified comprising means to extrude said material, and means to receive and support the extruded material while it is solidifying, means to feed a rack into position to receive the solidified material passing from said receiving and supporting means, means to automatically feed a second rack into position as the preceding rack is filled, said automatic feed means including a constantly moving source of power and a one revolution clutch, said clutch being connected on its driving side to said source of power and having its driven side connected to said feed means, means to sever the extruded and solidified material, means to feed a rack past the severing means in order that the severed product may be placed thereon, feeler means cooperating with said racks to determine when a rack has been filled and, means actuated by said feeler to connect said one revolution clutch into driving relation whereby said second rack may be delivered into position.

18. A machine for solidifying and stacking a material that may be extruded and solidified comprising means to extrude said material, and means to receive and support the extruded material while it is solidifying, a rack supplying means, a rack mounted in said supplying means for movement into proximity to said receiving means, means to feed said mounted rack into position to receive the solidified material, means to automatically effect the feeding of a second rack into position as the preceding rack is filled, said automatic feed means including a constantly moving source of power and a one revolution clutch, said clutch being connected on its driving side to said source of power and having its driven side connected to said feed means, means to sever the extruded and solidified material, means to feed said racks from said position past the severing means in order that the severed product may be placed thereon, feeler means cooperating with said racks to determine when a rack has been filled, means actuated by said feeler to connect said one revolution clutch into driving relation whereby said second rack may be delivered into position, and said feed means for delivering said rack past said severing means including means engaging said second rack to drive said rack against the filled rack to advance the two racks forwardly to drive said filled rack from a position under the severing means and to position the empty rack thereunder.

19. A machine for solidifying and then subdividing, a fluid material that may be extruded and solidified continuously into stick form having means to continuously extrude the material, and means to continuously receive and support the extruded material while it is solidifying into stick form, comprising means to sever the extruded stick, resilient means to drive said severing means, a latch for holding said resilient means compressed, continuously moving drive means to compress said resilient means, and means operative in timed relation to the extrusion of material from said extruding means to release said latch.

20. A machine for solidifying, subdividing, and stacking a material that may be extruded and solidified having means to extrude said material, and means to receive and support the extruded material while it is solidifying into stick form, comprising means to sever the extruded stick, means to feed a rack into position and past said severing means to receive the solidified and cut material, said severing means including resilient means to drive it, a latch for holding said resilient means compressed, and continuously moving drive means to compress the resilient means, said continuously moving means being driven from said rack feed means, and means operative in timed relation to the extrusion of material from said extrusion means to release said latch.

21. A machine for solidifying, subdividing, and stacking a material that may be extruded and solidified having means to extrude said material, and means to receive and support the extruded material while it is solidifying into stick form, comprising a rack supplying means, a rack mounted in said supplying means for movement into proximity to said receiving means, means for feeding said mounted rack into position to receive the solidified material passing from said receiving and supporting means, means to sever the extruded stick, and means to feed said rack from said position longitudinally along with said stick, said rack being moved at a faster rate of velocity than the velocity of movement of said stick whereby the severed blocks are placed on the rack at spaced intervals.

22. A machine for solidifying and stacking a material that may be extruded and solidified comprising means to extrude said material, and means to receive and support the extruded material while it is solidifying into stick form, means to feed a rack into position to receive the solidified material, means to sever the extruded stick, and means to feed the rack longitudinally along with the stick of extruded material, said rack being moved at a faster rate than the rate of movement of the stick of material whereby the severed blocks are placed on the rack at spaced intervals, said stick being continuously supported over said rack by a rigid anvil as the two are moved longitudinally through the machine and past the cutting means.

23. A conveyor for handling materials that will flow comprising a frame for supporting the conveyor structure, pairs of opposed endless belts to receive and convey the material, each of said belts being disposed with the face of one belt in contact with the edge of another belt, and bearing means for supporting said belts, said bearing means being carried by said frame and adjustable so that the cross-sectional area of material as defined by said belts may be varied whereby the volume of material carried by said conveying means may be controlled.

24. A conveyor for handling materials that will flow comprising a frame for supporting the conveyor structure, two pairs of opposed endless belts to receive and convey the material, each of said belts being disposed with the face of one belt in contact with the edge of another belt, and bearing means for supporting said belts, said bearing means being carried by said frame and adjustable so that the cross-sectional area of material as defined by said belts may be varied whereby the volume of material carried by said conveying means may be controlled.

CHARLES T. WALTER.